US012746759B2

(12) United States Patent
Shibata

(10) Patent No.: US 12,746,759 B2
(45) Date of Patent: Sep. 29, 2026

(54) DEAERATION APPARATUS, INKJET RECORDING APPARATUS, DEAERATION METHOD, AND STORAGE MEDIUM

(71) Applicant: Konica Minolta, Inc., Tokyo (JP)

(72) Inventor: Hiroshi Shibata, Chofu (JP)

(73) Assignee: KONICA MINOLTA, INC., Tokyo (JP)

( * ) Notice: Subject to any disclaimer, the term of this patent is extended or adjusted under 35 U.S.C. 154(b) by 119 days.

(21) Appl. No.: 18/897,186

(22) Filed: Sep. 26, 2024

(65) Prior Publication Data

US 2025/0108626 A1 Apr. 3, 2025

(30) Foreign Application Priority Data

Oct. 2, 2023 (JP) ................................. 2023-171115

(51) Int. Cl.
*B41J 2/19* (2006.01)
*B41J 2/21* (2006.01)

(52) U.S. Cl.
CPC ............... *B41J 2/19* (2013.01); *B41J 2/2103* (2013.01)

(58) Field of Classification Search
None
See application file for complete search history.

(56) References Cited

U.S. PATENT DOCUMENTS 9,713,925 B2 * 7/2017 Nakamura ................. B41J 2/18
2019/0143708 A1 * 5/2019 Stöckle ....................... B41J 2/19 347/6
2019/0240987 A1 * 8/2019 Osawa ............... B01D 19/0031

FOREIGN PATENT DOCUMENTS

JP 2015-168257 A 9/2015

* cited by examiner

*Primary Examiner* — Scott A Richmond
(74) *Attorney, Agent, or Firm* — LUCAS & MERCANTI, LLP

(57) ABSTRACT

A deaeration apparatus includes: an external reflux type deaeration module that includes a gas permeable membrane capable of removing a gas dissolved in ink; and a hardware processor that performs discharging control of discharging ink having soaked in the gas permeable membrane. The hardware processor performs the discharging control for multiple colors simultaneously.

10 Claims, 9 Drawing Sheets

FIG.10

| UNIT [kPa] | Y | M | C | K |
|---|---|---|---|---|
| DOWNSTREAM PRESSURE | −50 | −65 | −55 | −57.5 |
| UPSTREAM PRESSURE | −40 | −45 | −45 | −45 |
| PRESSURE DIFFERENCE Δi | 10 | 20 | 10 | 12.5 |

FIG.11

| NUMBER | 1 | 2 | 3 | 4 |
|---|---|---|---|---|
| COLOR | Y | C | K | M |
| Δi_sort | 10 | 10 | 12.5 | 20 |

FIG.12

| GROUP | 1 | | | 2 |
|---|---|---|---|---|
| NUMBER | 1 | 2 | 3 | 4 |
| COLOR | Y | C | K | M |
| Δi_sort | 10 | 10 | 12.5 | 20 |

DEAERATION APPARATUS, INKJET RECORDING APPARATUS, DEAERATION METHOD, AND STORAGE MEDIUM

CROSS-REFERENCE TO RELATED APPLICATIONS

The entire disclosure of Japanese Patent Application No. 2023-171115 filed on Oct. 2, 2023 is incorporated herein by reference in its entirety.

TECHNICAL FIELD

The present invention relates to a deaeration apparatus, an inkjet recording apparatus, a deaeration method, and a storage medium.

DESCRIPTION OF THE RELATED ART

Conventionally, there has been known an inkjet recording apparatus that forms an image on a recording surface of a recording medium by ejecting ink from nozzles of an inkjet head. In the inkjet recording apparatus, if a gas dissolved in ink remains as air bubbles, the gas causes malfunctions such as non-ejection of ink from the nozzles. For this reason, there is known an inkjet recording apparatus provided with an external reflux type deaeration module on an ink supply path that supplies ink from an ink tank to the inkjet head. In a hollow cylindrical body of the deaeration module, a gas permeable membrane, such as multiple hollow fiber membranes, is housed. At least one end of the gas permeable membrane of the deaeration module is connected to the vacuum pump, so that the inside of the gas permeable membrane can be depressurized. When the ink is in contact with the interface of the gas permeable membrane the inside of which is depressurized, the gas dissolved in the ink permeates the gas permeable membrane and is removed (deaeration).

As the deaeration module is repeatedly used, clogging occurs due to the ink component that has soaked in the gas permeable membrane. As a result, the deaeration performance of the deaeration module is decreased. Since the deaeration module is expensive, it is not preferable in terms of cost to replace the deaeration module every time the deaeration performance is decreased.

For example, Japanese Unexamined Patent Publication No. 2015-168257 discloses a configuration to discharge ink components that have soaked in the tubes of the hollow fiber membranes by opening hollow fiber valves.

However, the configuration described in Japanese Unexamined Patent Publication No. 2015-168257 has a problem that, when the discharging control of discharging ink components is performed for multiple colors, the discharging control takes time for the number of colors. Since printing cannot be performed during the discharging control, the discharging control for the number of colors causes a long printing downtime.

The present invention has an object to provide a deaeration apparatus, an inkjet recording apparatus, a deaeration method, and a non-transitory computer-readable recording medium storing a program that can reduce printing downtime.

SUMMARY OF THE INVENTION

To achieve at least one of the abovementioned objects, according to an aspect of the present invention, a deaeration apparatus includes: an external reflux type deaeration module that includes a gas permeable membrane capable of removing a gas dissolved in ink; and a hardware processor that performs discharging control of discharging ink having soaked in the gas permeable membrane, wherein the hardware processor performs the discharging control for multiple colors simultaneously.

According to another aspect of the present invention, there is provided a deaeration method for a deaeration apparatus that includes an external reflux type deaeration module having a gas permeable membrane capable of removing a gas dissolved in ink, the method including performing discharging control of discharging ink having soaked in the gas permeable membrane, wherein the discharging control is performed for multiple colors simultaneously.

According to another aspect of the present invention, there is provided a nontransitory computer-readable storage medium storing a program for a computer of a deaeration apparatus that includes an external reflux type deaeration module having a gas permeable membrane capable of removing a gas dissolved in ink, the program causing the computer to perform discharging control of discharging ink having soaked in the gas permeable membrane, wherein the program causes the computer to perform the discharging control for multiple colors simultaneously.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention, wherein:

FIG. 10 shows examples of the calculated upstream pressure, downstream pressure, and pressure difference for each color;

FIG. 11 is a diagram in which the calculated pressure differences Δi of the respective colors are rearranged in ascending order;

FIG. 12 shows an example of grouping the pressure differences of the respective colors arranged in ascending order;

DETAILED DESCRIPTION

Hereinafter, one or more embodiments of the present invention will be described with reference to the drawings. However, the scope of the invention is not limited to the disclosed embodiments.

Figure 1:
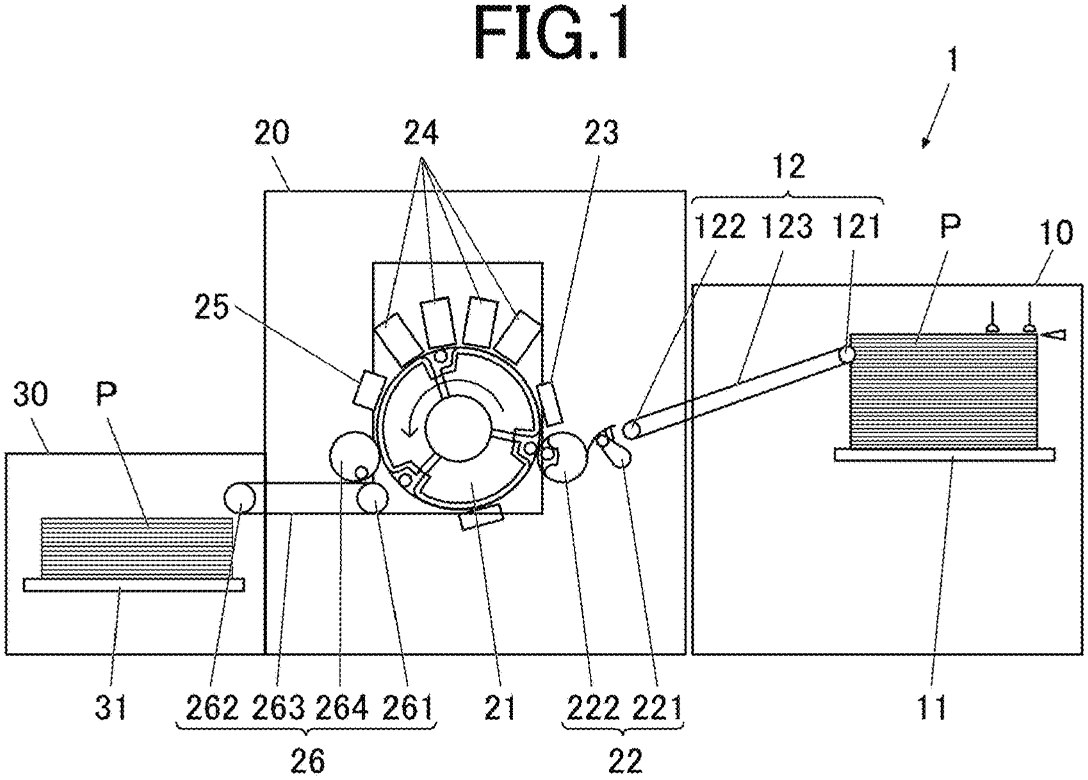
FIG. 1 is a diagram illustrating a schematic configuration of an inkjet recording apparatus according to the present embodiment.
Figure 2:
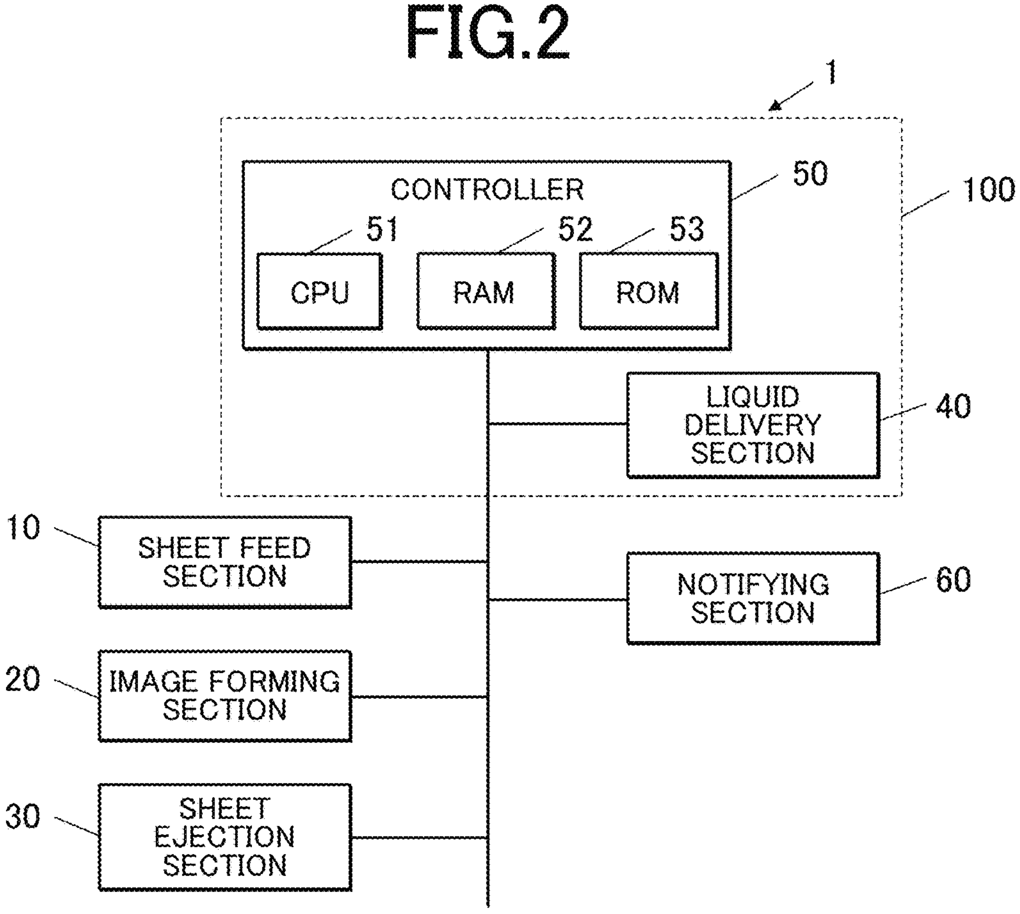
FIG. 2 is a functional block diagram illustrating a control structure of the inkjet recording apparatus according to the present embodiment.

As illustrated in FIGS. 1 and 2, the inkjet recording apparatus 1 according to the present embodiment includes a sheet feed section 10, an image forming section 20, a sheet ejection section 30, a liquid delivery section 40, a controller 50 (hardware processor), and a notifying section 60. The liquid delivery section 40 and the controller 50 function as the deaeration apparatus 100 of the present invention.

The inkjet recording apparatus 1 conveys recording media P from the sheet feed section 10 to the image forming section 20 under the control of the controller 50. The controller 50 then causes the image forming section 20 to form images on the recording media P with the ink supplied by the liquid delivery section 40. After forming the images, the controller 50 ejects the recording medium P to the sheet ejection section 30.

The sheet feed section 10 stores recording media P on which images are not formed. The sheet feed section 10 conveys the recording media P to the image forming section 20 under the control of the controller 50. The sheet feed section 10 includes a sheet feed tray 11 and a conveyance section 12.

The sheet feed tray 11 is a plate member that stores the recording media P. The sheet feed tray 11 is provided such that one or more recording media P can be placed thereon. The sheet feed tray 11 is moved upward and downward according to the amount of the recording media P placed thereon. By the upward and downward movements, the sheet feed tray 11 is kept such that the uppermost recording medium P is conveyed by the conveyance section 12.

The conveyance section 12 conveys the recording media P from the sheet feed tray 11 to the image forming section 20. The conveyance section 12 includes a conveyance mechanism. The conveyance mechanism drives a belt 123 to convey the recording media P on the belt 123. The belt 123 has a ring shape, and the inner side of the ring is supported by rollers 121 and 122. The conveyance section 12 includes a supply section. The supply section delivers the uppermost recording medium P placed on the sheet feed tray 11 onto the belt 123. The conveyance section 12 conveys the recording medium P along the belt 123 by the supply section.

The image forming section 20 records an image on the recording medium P in cooperation with the liquid delivery section 40 under the control of the controller 50. The image forming section 20 includes an image forming drum 21, a passing unit 22, a sheet heater 23, head units 24, an irradiator 25, and a delivery unit 26.

The image forming drum 21 holds the recording medium P along its cylindrical outer peripheral surface and rotates to carry the recording medium P. The carrying surface of the image forming drum 21 faces the sheet heater 23, the head units 24, and the irradiator 25, which perform image forming processing on the carried recording medium P.

The passing unit 22 is positioned between the conveyance section 12 and the image forming drum 21. The passing unit 22 includes a claw 221 and a passing drum 222.

The claw 221 is a cylindrical part that holds one end of the recording medium P conveyed by the conveyance section 12. The passing drum 222 guides the recording medium P held by the claw 221.

The passing unit 22 picks up the recording medium P on the conveyance section 12 with the claw 221 and places the recording medium P along the outer peripheral surface of the passing drum 222. Thus, the passing unit 22 passes the recording medium P to the image forming drum 21.

The sheet heater 23 includes, for example, a heating wire and generates heat by being energized. The sheet heater 23 is controlled by the controller 50 to generate heat so that the recording medium P passing near the sheet heater 23 is heated to a predetermined temperature. The sheet heater 23 is positioned near the outer circumferential surface of the image forming drum 21 and on the upstream side of the head units 24 in the conveyance direction of the recording medium P.

A temperature sensor (not illustrated) is provided near the sheet heater 23. With the temperature sensor, the controller 50 detects the temperature around the sheet heater 23. Based on the detected temperature, the controller 50 controls heat generation of the sheet heater 23.

The head units 24 eject ink droplets from nozzles onto the recording medium P to form an image. The head units 24 corresponding to the colors of C (cyan), M (magenta), Y (yellow), and K (black) are provided. In FIG. 1, the head units 24 corresponding to the colors of Y, M, C, and K are provided in this order from the upstream of the conveyance direction of the recording medium P.

In a plan view, the direction perpendicular to the conveyance direction of the recording medium P is defined as a width direction. The head units 24 of the present embodiment have a length (width) that covers the entire width of the recording medium P in the width direction. That is, the inkjet recording apparatus 1 is a one-pass line-head type inkjet recording apparatus. Each of the head units 24 has rows of inkjet heads **24*a* (see FIG. 3). The inkjet heads 24*a* are an ink ejection head according to the present invention that ejects ink from nozzles. The number of the head units 24 may be greater than four or less than four. Further, one head unit 24 may be constituted of one inkjet head 24*a***.

The ink jetted by the head units 24 is, for example, ultraviolet curable ink (UV ink). The ultraviolet curable ink is gel ink that undergoes a phase change between a gel state and a liquid state depending on a temperature when not irradiated with ultraviolet rays by the irradiator 25. The ultraviolet curable ink has a phase change temperature of, for example, about 40 to 100° C., and is uniformly liquefied (solated) by being heated to the phase change temperature or higher. On the other hand, the ultraviolet curable ink is gelled at about normal room temperature, that is, about 0 to 30° C.

The irradiator 25 includes, for example, a fluorescent tube such as a low-pressure mercury lamp. The irradiator 25 emits energy rays such as ultraviolet rays by lighting up the fluorescent tube. The irradiator 25 is provided near the outer peripheral surface of the image forming drum 21. The irradiator 25 is positioned in the downstream of the head units 24 in the conveyance direction of the recording medium P.

The irradiator 25 irradiates the recording medium P on which ink has been jetted with energy rays. The ink on the recording medium P is cured by the effect of the energy rays.

The fluorescent tube that emits ultraviolet rays is not limited to the low-pressure mercury lamp. The fluorescent tube may be a mercury lamp with operating pressure of a few hundred Pa to 1 MPa, for example. Further, the fluorescent tube may be a light source that can be used as a germicidal lamp. Examples of light sources usable as the germicidal lamp include a cold-cathode tube, an ultraviolet laser light source, a metal halide lamp, and a light-emitting diode. The fluorescent tube is desirably a power saving light source capable of emitting ultraviolet rays with higher illuminance. The fluorescent tube is, for example, a light emitting diode. The energy ray is not limited to the ultraviolet rays and may be an energy ray having a property of curing the ink depending on the property of the ink. The light source is determined depending on the energy rays.

Although the head units 24 jet the ultraviolet curable ink in the above description, the invention is not limited thereto. The ink jetted by the head units 24 may be water-based ink or ink having other physical properties.

The delivery unit 26 includes a conveyance mechanism. The conveyance mechanism drives a ring-shaped belt 263 to convey the recording medium P. The inner side of the belt 263 is supported by rollers 261 and 262. The delivery unit 26 includes a cylindrical passing roller 264. The passing roller 264 passes the recording medium P from the image forming drum 21 to the conveyance mechanism. The delivery unit 26 conveys and sends the recording medium P passed on the belt 263 by the passing roller 264 to the sheet ejection section 30.

The recording medium P on which an image has been formed by the image forming section 20 is ejected to the sheet ejection section 30. The sheet ejection section 30 includes a plate-shaped sheet ejection tray 31. The recording medium P sent out from the image forming section 20 by the delivery unit 26 is placed on the sheet ejection tray 31. The sheet ejection section 30 stores the recording medium P until a user takes out the recording medium P.

Figure 3:
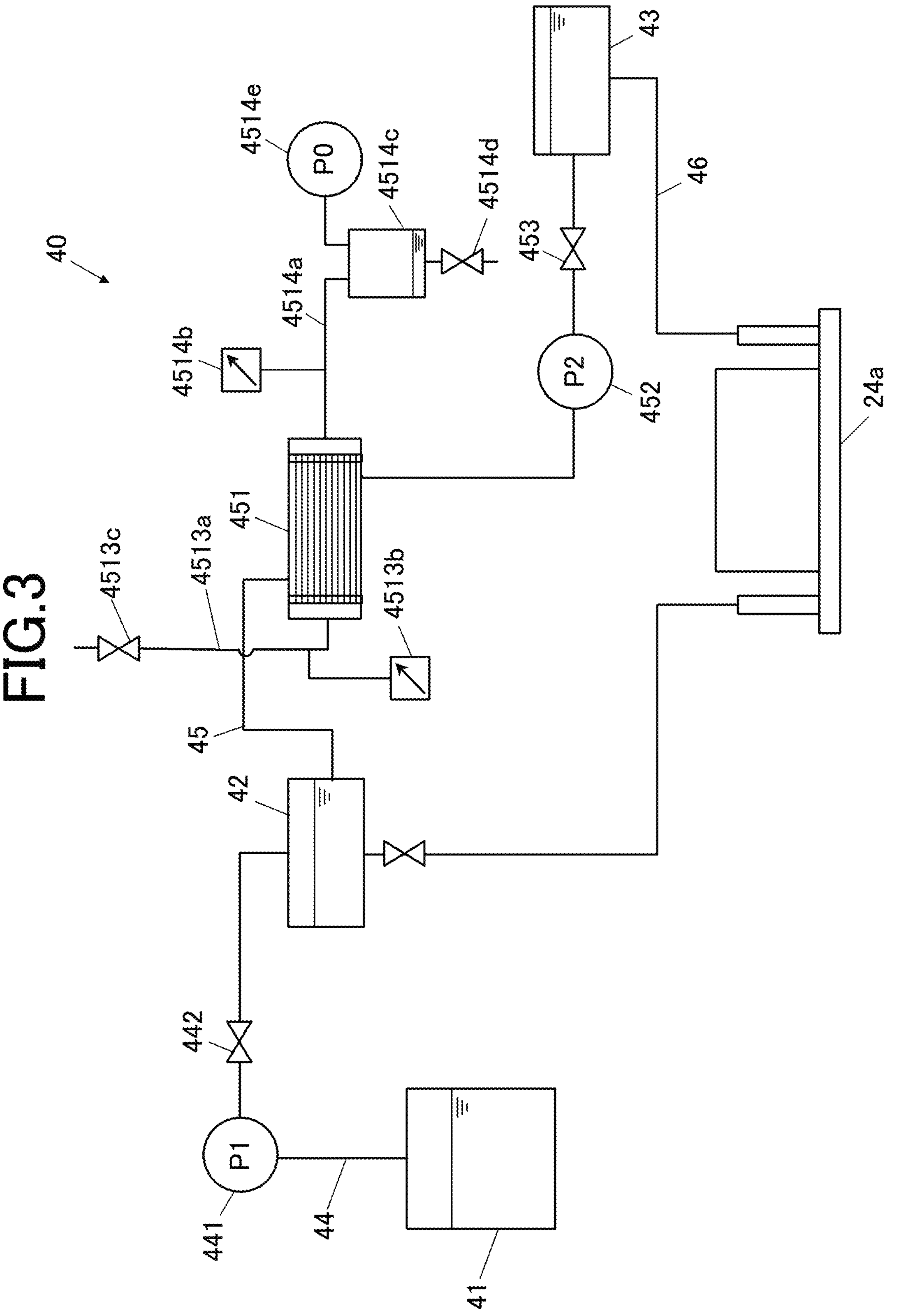
FIG. 3 is a view illustrating a schematic configuration of a liquid delivery section.

FIG. 3 shows a schematic configuration of the liquid delivery section 40.

The liquid delivery section 40 includes multiple main tanks 41 that store the respective colors of ink. The liquid delivery section 40 supplies the inks of the respective colors in the main tanks 41 to the respective head units 24. Thus, the liquid delivery section 40 can jet the ink of the respective colors from nozzles.

The liquid delivery section 40 includes, as an ink storage section, a main tank 41, a first sub tank 42, and a second sub tank 43. The liquid delivery section 40 also includes a deaeration module 451 that removes gas dissolved in the ink before the ink is delivered to the head units 24.

The main tank 41 stores ink to be supplied to each part of the liquid delivery section 40. The main tank 41 is, for example, a rigid sealed tank made of metal. The main tank 41 is connected to the first sub tank 42 via a supply pipe 44. The supply pipe 44 is provided with a supply pump 441 and a supply valve 442.

The supply pump 441 and the supply valve 442 operate under the control of the controller 50. The ink in the main tank 41 is supplied to the first sub tank 42 via the supply pipe 44 by the driving of the supply pump 441 when the supply valve 442 is open. The entire main tank 41 is replaceable. Further, the main tank 41 can be attached to and detached from the supply pipe 44 regardless of the driving state of the supply pump 441.

The first sub tank 42 is one or more ink chambers having a smaller capacity than the main tank 41. The first sub tank 42 stores the ink pumped from the main tank 41 by the supply pump 441. The first sub tank 42 reduces pressure fluctuation caused by the pulsation of the supply pump 441 when the supply pump 441 supplies the ink from the main tank 41. The first sub tank 42 collects ink that has not been jetted from the inkjet heads 24*a* from the outlet. The first sub tank 42 is connected to the second sub tank 43 via a liquid feed pipe 45. The liquid feed pipe 45 is provided with a deaeration module 451, a liquid feed pump 452, a liquid feed valve 453, and so forth.

The liquid feed pump 452 sends the ink that has flowed out from an ink outlet 4511*b* (see FIG. 4) of the deaeration module 451 to the second sub tank 43. A check valve (not illustrated) is provided between the liquid feed pump 452 and the second sub tank 43 to prevent backflow of the ink sent to the second sub tank 43.

The liquid feed valve 453 is an electromagnetic valve. The liquid feed valve 453 selectively opens and closes the liquid feed tube 45 during operation of the liquid feed pump 452 under the control of the controller 50.

The second sub tank 43 is a small tank chamber that temporarily stores ink that has been deaerated by the deaeration module 451. The capacity of the second sub tank 43 is substantially the same as that of the first sub tank 42, for example. The second sub tank 43 is connected to the inlet of each of the inkjet heads 24*a* via a supply path 46. The ink in the second sub tank 43 is supplied to each of the inkjet heads 24*a* depending on the amount of ink jetted from the nozzles. The second sub tank 43 is provided with a back pressure adjusting means (not illustrated). The back pressure adjusting means prevents leakage of the ink by applying an appropriate negative pressure to the inkjet heads 24*a*.

Figure 4:
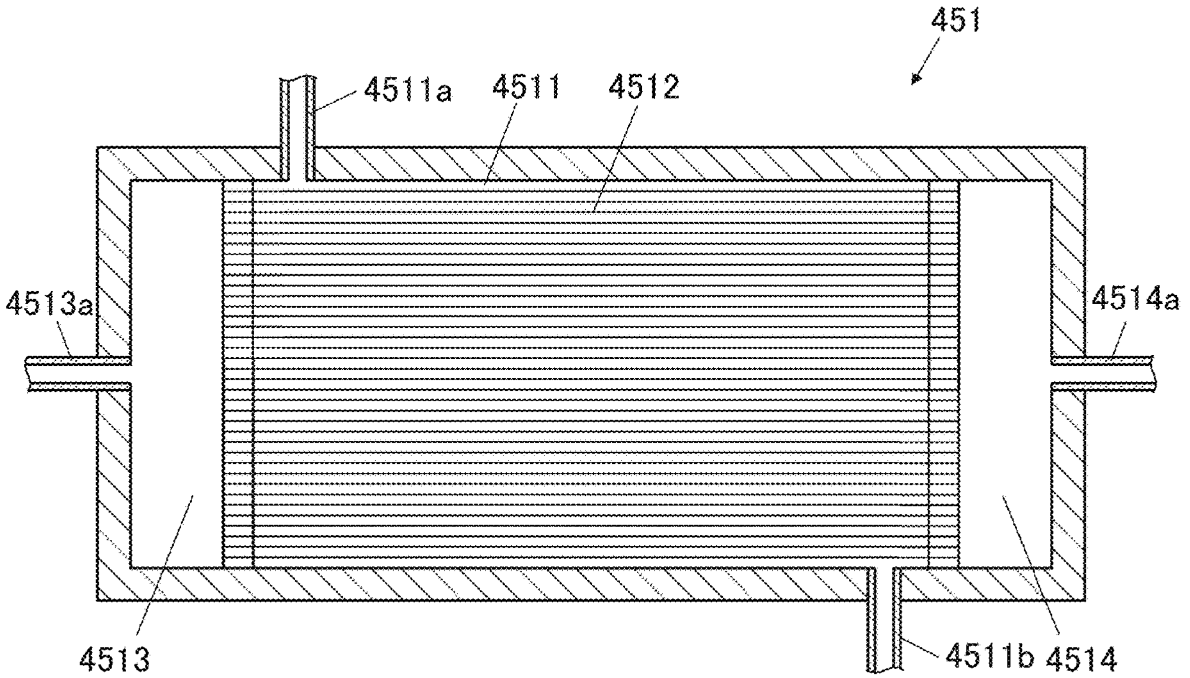
FIG. 4 is a diagram illustrating a configuration of a deaeration module.

FIG. 4 shows a configuration of the deaeration module.

The deaeration module 451 removes gas dissolved in the ink having flowed in the deaeration module 451 and discharges the deaerated ink. The deaeration module 451 includes an ink flow chamber 4511, hollow fiber membranes 4512, a first vacuum chamber 4513, and a second vacuum chamber 4514. That is, the deaeration module 451 is an external reflux type deaeration module housing the hollow fiber membranes 4512 therein. The deaeration module 451 is provided between the ink storage section (the main tank 41 and the first sub tank 42) and the inkjet head 24*a*.

The ink flow chamber 4511 is provided at the central part of the inside of the casing that forms the deaeration module 451. The ink flow chamber 4511 is provided with an ink inlet 4511*a* and the ink outlet 4511*b*. The ink flow chamber 4511 receives inflow of ink from the first sub tank 42 via the ink inlet 4511*a*. The ink flow chamber 4511 flow out the ink to the second sub tank 43 via the ink outlet 4511*b*.

It is preferable that the ink inlet 4511*a* be provided on a first end side of the ink flow chamber 4511. It is also preferable that the ink outlet 4511*b* be provided on a second end side of the ink flow chamber 4511. With this structure, the ink is more likely to be in contact with the hollow fiber membranes 4512, so that the deaeration efficiency of the deaeration module 451 is increased.

The hollow fiber membranes 4512 are tubular, and the membrane surfaces thereof are gas-permeable. The hollow fiber membranes 4512 is the gas permeable membrane of the present invention and has a large number of hollow microfiber structures. The hollow fiber membranes 4512 is constituted of a large number of hollow microfiber structures in a bundle and arranged such that the hollow fine microfiber structures extend in the axial direction of the ink flow chamber 4511.

The hollow fiber membranes 4512 is arranged so as to communicate with the first vacuum chamber 4513 and the second vacuum chamber 4514. Therefore, the first end of the hollow fiber membranes 4512 is connected to the atmosphere via the hollow fiber valve 4513*c*. The second end of the hollow fiber membranes 4512 is connected t the vacuum pump 4514*e*.

The first vacuum chamber 4513 is provided at the first end of the deaeration module 451. The first vacuum chamber 4513 is formed by being partitioned from the ink flow chamber 4511 by a partition wall. A side of the first vacuum chamber 4513 opposite the ink flow chamber 4511 is connected to the atmosphere via a first vacuum path 4513*a*. The first vacuum path 4513*a* is provided with a first pressure sensor 4513*b*, the hollow fiber valve 4513*c*, and so forth.

The first pressure sensor 4513*b* detects a pressure value in the first vacuum chamber 4513 and sends the pressure value to the controller 50.

The hollow fiber valve 4513*c* is an electromagnetic valve. The hollow fiber valve 4513*c* opens the first vacuum path 4513*a* to the atmosphere in accordance with a control signal from the controller 50.

The second vacuum chamber 4514 is provided on the second end side of the deaeration module 451. The second vacuum chamber 4514 is formed by being partitioned from the ink flow chamber 4511 by a partition wall. The second vacuum chamber 4514 communicates with a decompression tank 4514*c* via a second vacuum path 4514*a*. The second vacuum path 4514*a* is provided with a second pressure sensor 4514*b* that detects a pressure value inside the second vacuum path 4514*a*.

The second pressure sensor 4514*b* detects a pressure value in the second vacuum chamber 4514 and sends the pressure value to the controller 50. The controller 50 controls driving of the deaeration module 451, based on the pressure values obtained from the first pressure sensor 4513*b* and the second pressure sensor 4514*b*. Although the second pressure sensor 4514*b* is provided in the flow path between the deaeration module 451 and the decompression tank 4514*c* in the disclosed configuration, the configuration is not limited thereto. The second pressure sensor 4514*b* may be provided in a channel between the decompression tank 4514*c* and the vacuum pump 4514*e*.

The decompression tank 4514*c* includes an ink discharging valve 4514*d* and a vacuum pump 4514*e*. The decompression tank 4514*c* is capable of accommodating a predetermined volume of gas and is capable of suppressing fluctuation in pressures in the hollow fiber membranes 4512 due to pulsation of the vacuum pump 4514*e*. The decompression tank 4514*c* stores the ink that has soaked in the hollow fiber membranes 4512 and entered the second vacuum path 4514*a*. The decompression tank 4514*c* stores the ink to prevent the ink from reaching the vacuum pump 4514*e* and from causing malfunctions of the vacuum pump 4514*e*. The ink stored in the decompression tank 4514*c* is discharged to the outside by the ink discharging valve 4514*d*.

The vacuum pump 4514*e* is a diaphragm pump. Specifically, the vacuum pump 4514*e* includes a pump chamber having an extendable diaphragm. The vacuum pump 4514*e* includes a drive source that operates the diaphragm such that the capacity of the pump chamber increases and decreases. The pump chamber includes a suction port having a check valve that allows only inflow of a fluid from the outside. The pump chamber includes a discharging port having a check valve that allows only discharging of the fluid from the inside.

Under the control of the controller 50, the vacuum pump 4514*e* suck the air in the hollow fiber membranes 4512 when the hollow fiber valves 4513*c* are opened. In the hollow fiber membranes 4512, foreign matters are removed and the pressure is reduced by the operation of the vacuum pump 4514*e*. When the ink flowing in the ink flow chamber 4511 is in contact with the membrane surface of the hollow fiber membranes 4512, the dissolved gas is selectively passed through the membrane surface, so that the ink is deaerated. That is, a gas dissolved in the ink (dissolved oxygen) can be removed (the ink can be deaerated). Next, the dissolved gas having passed through the hollow fiber membranes 4512 flows down to the decompression tank 4514*c* via the second vacuum chamber 4514.

In the present invention, the external reflux type deaeration module 451 configured as described above is adopted. The configuration of the deaeration module 451 is not limited to a specific configuration. It is preferable that the deaeration module 451 be a sheet in which hollow fiber membranes 4512 are woven into a mesh shape, for example. This is because the meshes of the hollow fiber membranes 4512 becomes finer and all of the ink is easier to pass through the meshes of the hollow fiber membranes 4512, so that the deaeration efficiency is increased. With the above-described configuration, flexible hollow fiber membranes 4512 can have a certain level of strength.

The controller 50 controls the components constituting the inkjet recording apparatus 1. The controller 50 is connected to the components constituting the inkjet recording apparatus 1. The controller 50 includes a CPU51, a RAM52, and a ROM53.

The controller 50 performs the discharging control to discharge the ink that has soaked in the hollow fiber membranes 4512. Further, the controller 50 functions as a detection unit of the present invention capable of detecting the degree of clogging of the hollow fiber membranes 4512.

The CPU51 reads various programs and date corresponding to processing contents from the storage device of the ROM 53 or the like and executes them. Further, the CPU 51 controls the operation of the components constituting the inkjet recording apparatus 1 according to the contents of the executed processing.

The RAM 52 temporarily stores therein the various programs and date processed by the CPU 51.

The ROM 53 stores the various programs and date read by the CPU 51 or the like.

The notifying section 60 provides notification of various types of information under the control of the controller 50. The notifying section 60 is, for example, a display part having a screen or a communication section capable of communicating with other devices via a network.

Figure 5:
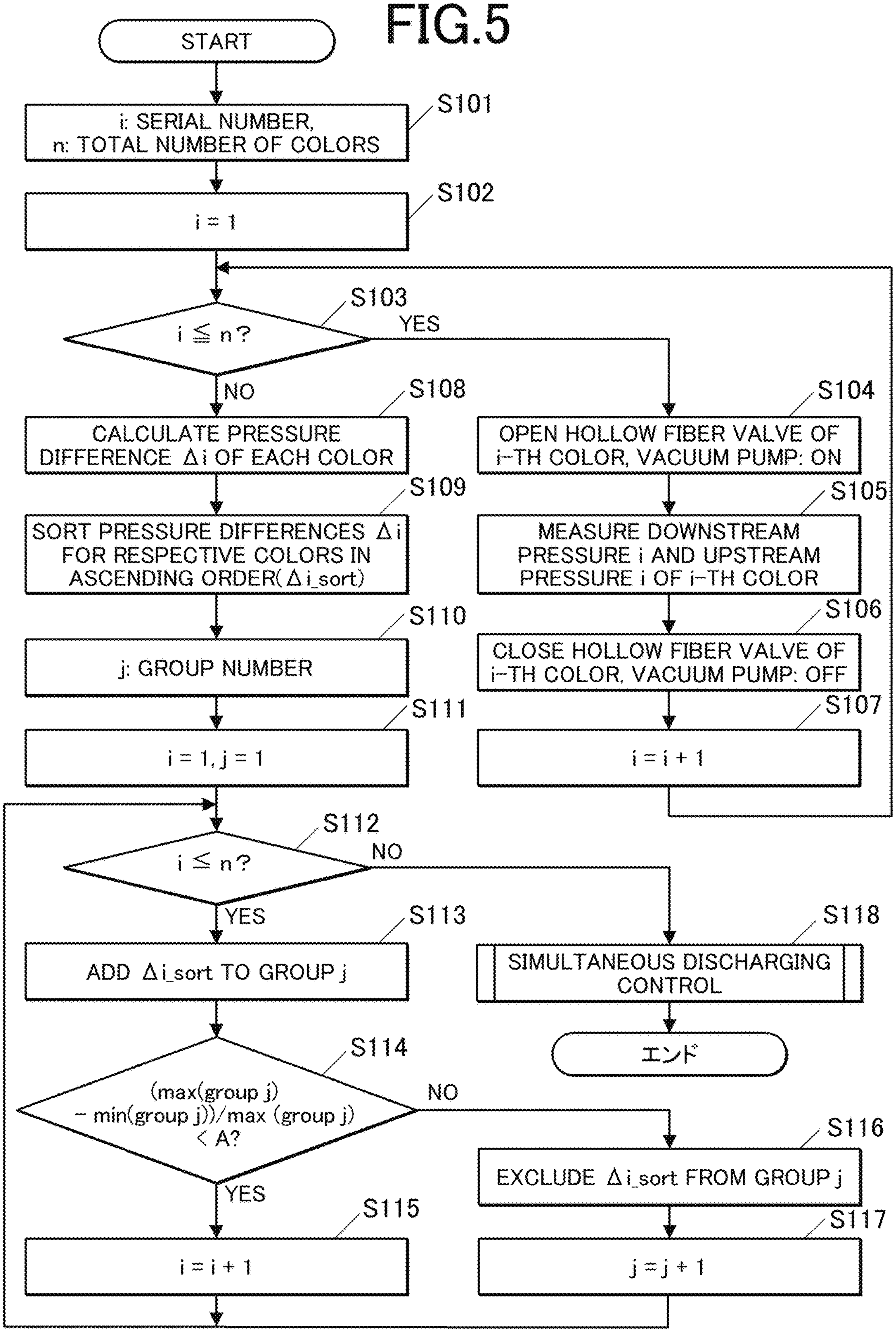
FIG. 5 is a flowchart showing an example of the control by the inkjet recording apparatus according to the present embodiment.

Next, the control by the inkjet recording apparatus 1 according to the present embodiment will be described with reference to the flowchart of FIG. 5. In the control shown in FIG. 5, the inkjet recording apparatus 1 performs the discharging control for multiple colors simultaneously. The control of FIG. 5 is started, for example, when the inkjet recording apparatus 1 is turned on. The control of FIG. 5 may be automatically executed at fixed time intervals or manually executed.

In this control, the controller 50 determines the number of colors for which the discharging control is to be performed simultaneously, according to the detected degree of clogging of the hollow fiber membranes 4512. In the example shown in FIG. 5, the controller 50 detects the degree of clogging, based on the difference (pressure difference) between the upstream pressure and the downstream pressure of the deaeration module 451.

Figure 6:
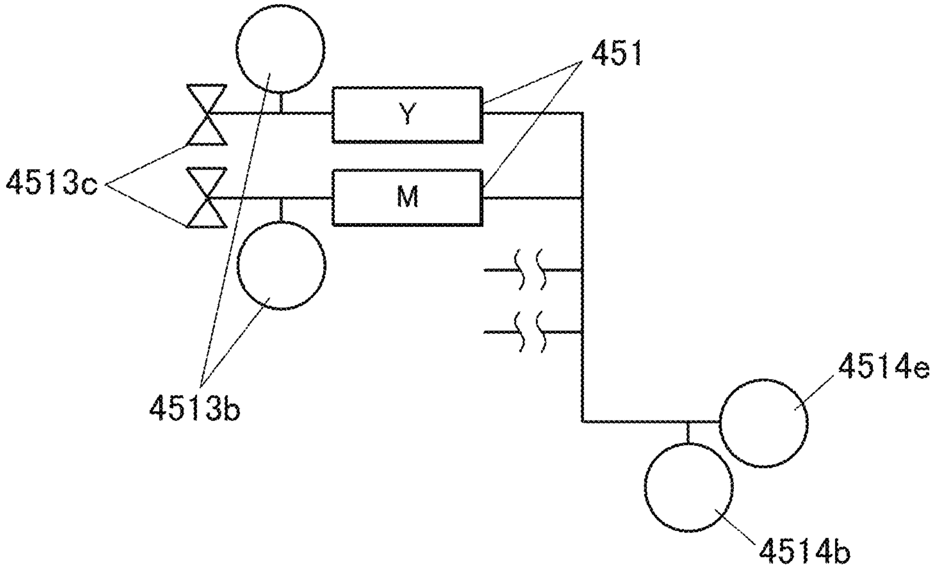
FIG. 6 shows an example of a simplified channel diagram in the vicinity of the deaeration module.

FIG. 6 shows an example of a schematic channel diagram in the vicinity of the deaeration module 451. Note that for convenience of explanation, FIG. 6 omits illustration of the deaeration modules 451 for two colors of C and K among the deaeration modules 451 for the four colors of Y, M, C and K. On the upstream side (the side of the hollow fiber valve 4513*c*) of the deaeration module 451 for each of the colors, the first pressure sensor 4513*b* is provided. On the downstream side (the side of the vacuum pumping 4514*e* side) of the deaeration module 451 for each of the colors, the second pressure sensor 4514*b* is provided. Thus, the difference between the upstream pressure and the downstream pressure of the deaeration module 451 for each color can be detected.

Figure 7:
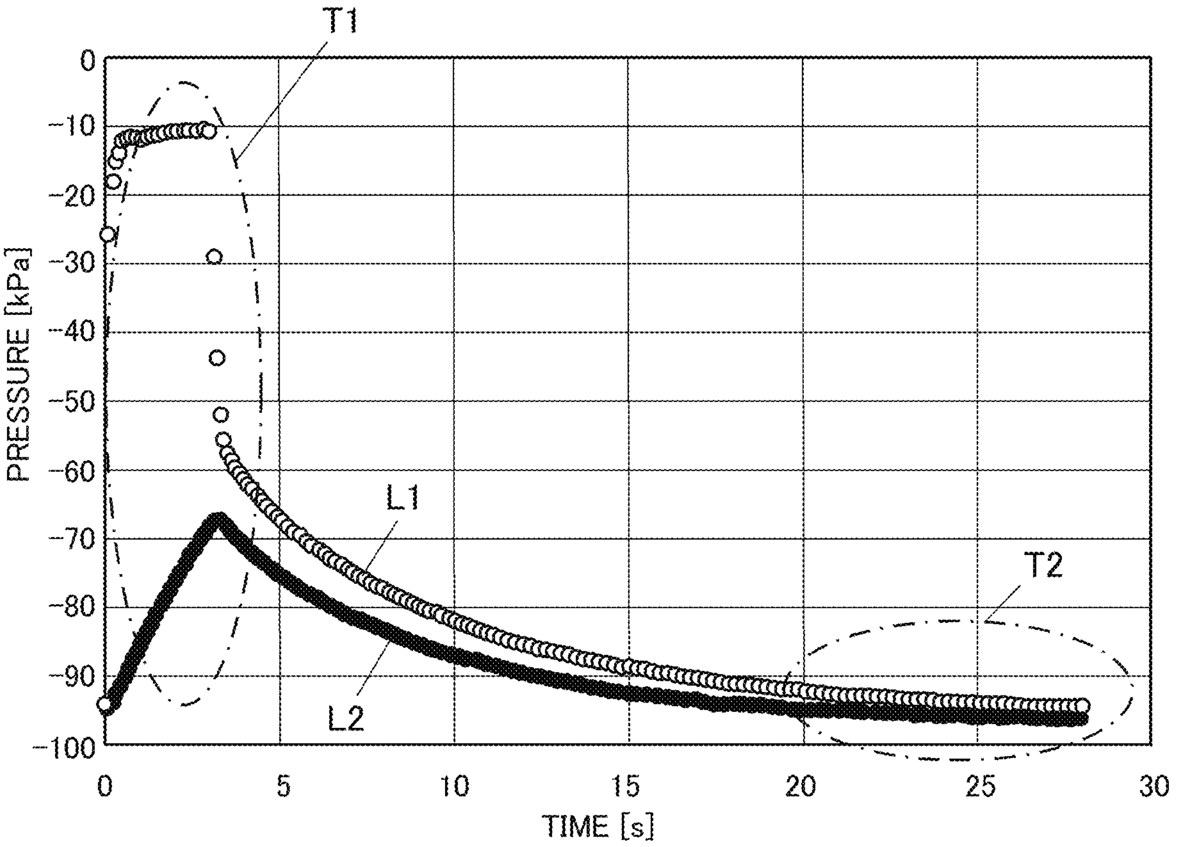
FIG. 7 shows an example of pressure transition during discharging control.

FIG. 7 shows an example of pressure transition during the discharging control. The symbol L1 in FIG. 7 indicates the pressure on the upstream side (the side of the hollow fiber valve 4513*c*) of the deaeration module 451. The symbol L2 indicates the pressure on the downstream side (the side of the vacuum pump 4514*e*) of the deaeration module 451. The example of FIG. 7 shows that the pressure difference while the hollow fiber valve is open (indicated by the symbol T1) is greater than the pressure difference in the normal state (indicated by the symbol T2). This is because the flow rate is large while the hollow fiber valve is open and a resistance difference caused by clogging of the hollow fiber membranes 4512 is tend to be detected as a pressure difference. The timing of obtaining (detecting) a pressure difference is not limited to a specific timing. The timing may be during the hollow fiber valve is open or may be in a normal state. However, it is more preferable that the timing be during the hollow fiber valve is open because the pressure difference is more easily detected.

Hereinafter, the simultaneous discharging control for multiple colors will be described with reference to the flowchart of FIG. 5.

First, the controller 50 defines the serial number as a variable "i" and the number of all colors as a constant "n" (step S101). For example, when the total number of colors is four colors of YMCK, "n" is determined as n=4.

Next, the controller 50 sets 1, which is an initial number, to the serial number i (i=1) (step S102).

Next, the controller 50 determines whether i≤n is satisfied or not (step S103).

When determining that i≤n is satisfied (step S103: YES), the controller 50 proceeds to the next step S104.

On the other hand, when determining that i>n is satisfied (step S103:NO), the controller 50 proceeds to step S108.

Next, the controller 50 opens the hollow fiber valve 4513*c* for the i-th color (OPEN) and drives (turns on) the vacuum pump 4514*e* (Step S104).

Next, the controller 50 measures the upstream-side pressure i and the downstream-side pressure i for the i-th color (step S105). The upstream-side pressure is the pressure on the upstream side (the side of the hollow fiber valve 4513*c*) of the deaeration module 451 measured by the first pressure sensor 4513*b*. The downstream-side pressure is the pressure on the downstream side (the side of the vacuum pump 4514*e*) of the deaeration module 451 measured by the second pressure sensor 4514*b*.

Next, the controller 50 closes the hollow fiber valve 4513*c* for the i-th color (CLOSE) and stops driving the vacuum pump 4514*e* (OFF) (step S106).

Next, the controller 50 adds "1" to the serial number i (i=i+1) (step S107).

In step S108, the controller 50 calculates the pressure difference Δi of each color. Specifically, the controller 50 calculates the pressure difference Δi by using the following Equation (1).

$$\text{Pressure difference } \Delta i = \text{Upstream pressure } i - \text{Downstream pressure } i \quad (1)$$

The calculated pressure difference Δi of each color indicates the degree of clogging of the hollow fiber membranes 4512 of each color.

As described above, the controller 50 detects the degree of clogging of the hollow fiber membranes 4512 using the difference between the upstream-side pressure and the downstream-side pressure of the deaeration module 451.

Next, the controller 50 arranges the pressure differences Δi of the respective colors in ascending order (step S109). The pressure differences Δi of the respective colors arranged in ascending order in step S109 is referred to as Δi_sort (see FIG. 11).

Next, the controller 50 defines the group number as a variable j (step S110).

Next, the controller 50 sets "1", which is an initial value, to the serial number i and to the group number j (i=1, j=1) (step S111).

Next, the controller 50 determines whether i≤n is satisfied or not (step S112).

When determining that i≤n is satisfied (step S112: YES), the controller 50 proceeds to the next step S113.

On the other hand, when determining that i>n is satisfied (step S112: NO), the controller 50 proceeds to step S118.

Next, the controller 50 adds Δ i_sort to the group j (step S113).

Figure 8:
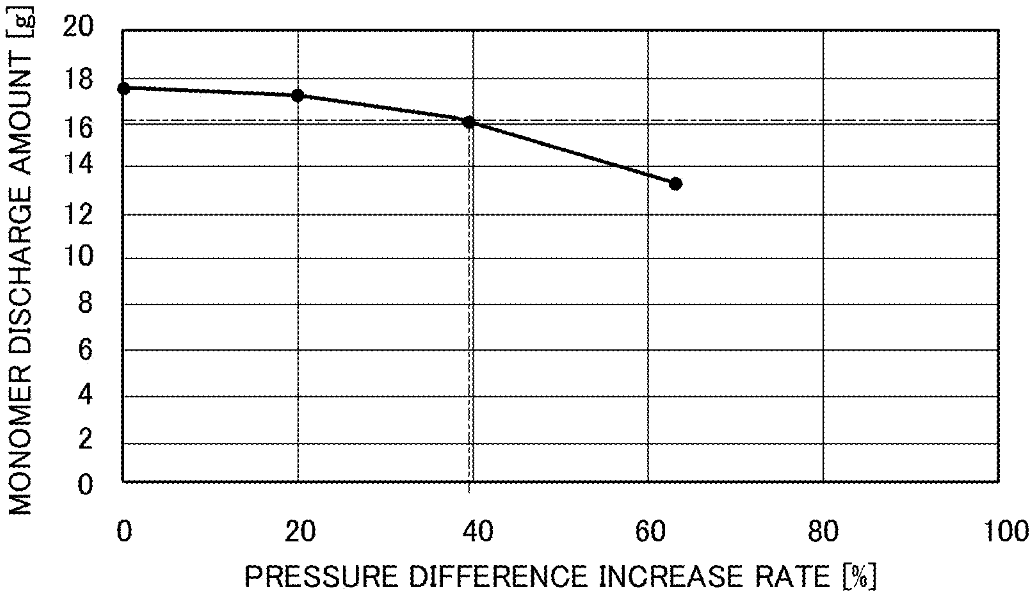
FIG. 8 is an example of the relationship between the pressure difference increase rate and the discharge amount.

Next, the controller 50 determines whether "(max (group j)−min (group j))/max (group j)<A" is satisfied or not (step S114). Max (group j) is the maximum value of Δi_sort in the group j. That is, max (group j) is the maximum pressure difference in the group j. Min (group j) is the minimum value of Δi_sort in the group j. That is, min (group j) is the minimum pressure difference in the group j. "A" is a predetermined threshold value. The predetermined threshold A is a reference value indicating the extent of the pressure difference that does not cause a problem when the discharging control is performed simultaneously. The predetermined value A is determined by the ink used and the performances of the deaeration modules 451 and the vacuum pump 4514*e*. For example, consider a case of using UV ink, silicone deaeration modules, and vacuum pumps of DTC-22 made by ULVAC KIKO Inc. When the increase rate of the pressure difference reaches 40%, the discharge amount of ink components (monomers) becomes equal to or less than the discharge target value of 16 g (see FIG. 8). The increase rate of the pressure difference is a ratio of the difference between the maximum pressure difference and the minimum pressure difference in the group j to the maximum pressure difference in the group j. In the example shown in FIG. 8, the predetermined threshold value A is 0.4. In step S114, the controller 50 determines that the discharging control cannot be simultaneously performed when the ratio of the difference between the maximum pressure difference and the minimum pressure difference in the group j to the maximum pressure difference in the group j exceeds the predetermined threshold A.

When the controller 50 determines that "(max (group j)−min (group j))/max (group j)<A" is satisfied (step S114: YES), the controller 50 determines that the discharging control can be simultaneously performed and proceeds to the next step S115.

On the other hand, when determining that "(max (group j)−min (group j))/max (group j)≥A" is satisfied (step S114: NO), the controller 50 determines that the discharging control cannot be performed simultaneously and proceeds to step S116.

Next, the controller 50 adds "1" to the serial number i (i=i+1) (step S115). The controller 50 then proceeds to step S112.

In step S116, the controller 50 removes Δi_sort from the group j.

Next, the controller 50 adds "1" to the group number j j=j+1) (step S117). The controller 50 then proceeds to step S112.

In step S118, the controller 50 performs the simultaneous discharging control. The simultaneous discharging control is the control of simultaneously performing the discharging control for all the colors belonging to each of all the groups. The discharging control is the control of opening the hollow fiber valve(s) 4513*c* (OPEN) and driving the vacuum pump 4514*e* (ON). For example, consider a case where Y, M, and C belong to a group 1 and K belong to a group 2. In the case, firstly the discharging control for Y, M, and C is simultaneously performed, and then the discharging control for K is performed. Thus, the discharging control can be simultaneously performed for colors having similar degrees of clogging.

Figure 9:
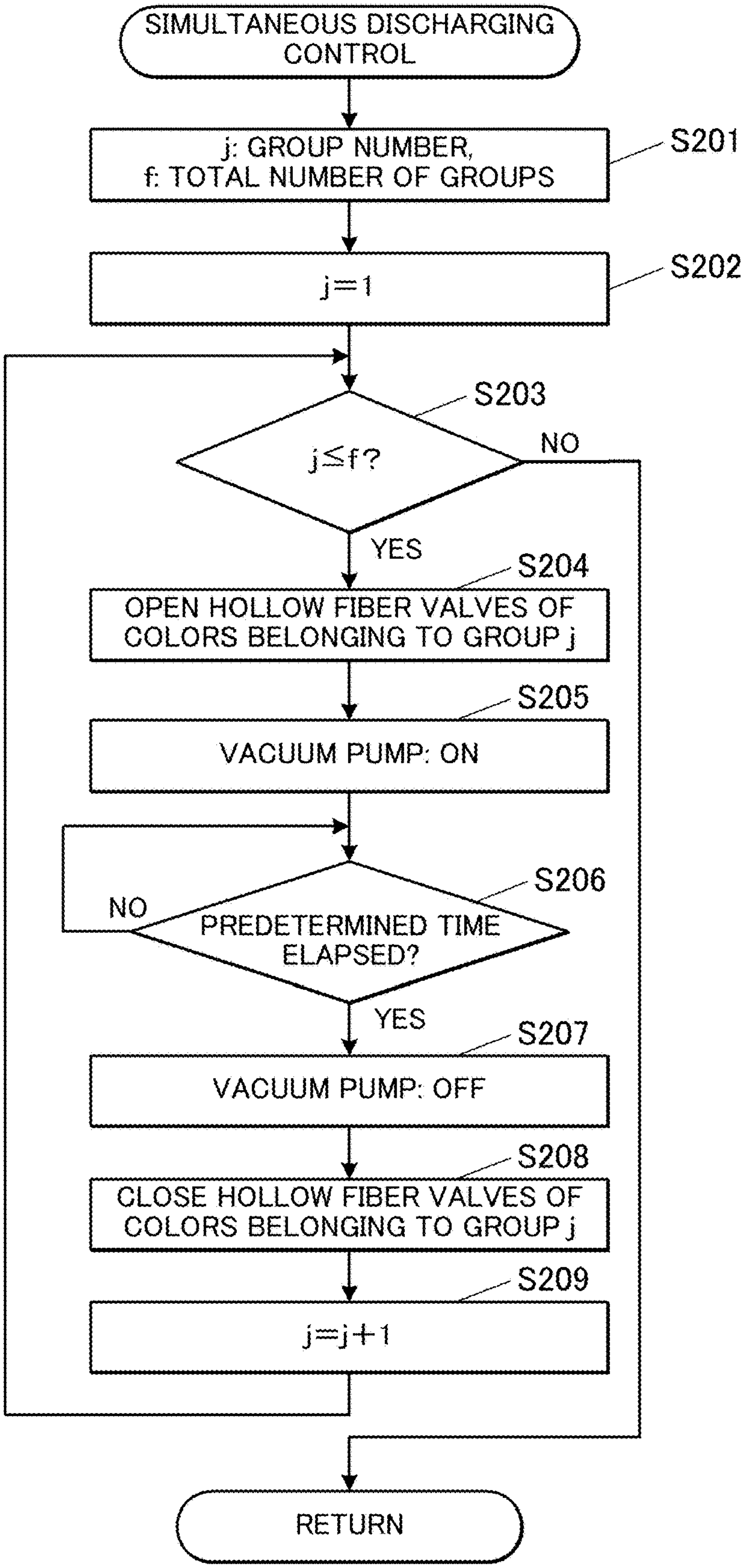
FIG. 9 is a flowchart showing an example of simultaneous discharging control that is performed in Step S118 of FIG. 5.

FIG. 9 is a flowchart showing an example of the simultaneous discharging control, which is performed in step S118 of FIG. 5.

First, the controller 50 defines the group number as a variable j and the total number of groups as a constant f (step S201). For example, if the number of groups is two, "f" is determined as f=2.

Next, the controller 50 sets "1" as an initial value to the group number j j=1) (step S202).

Next, the controller 50 determines whether j≤f is satisfied or not (step S203).

When the controller 50 determines that j≤f is satisfied (step S203: YES), the controller 50 proceeds to the next step S204.

On the other hand, when the controller 50 determines that j≤f is not satisfied (step S203: NO), the controller 50 ends the process.

In step S204, the controller 50 opens the hollow fiber valves 4513*c* of the colors belonging to the group j (OPEN).

Next, the controller 50 drives (turns on) the vacuum pump 4514*e* (step S205).

Next, the controller 50 determines whether or not a predetermined time has elapsed (step S206). The predetermined time is a driving time of the vacuum pump 4514*e* and is set to 300 seconds, for example, or more preferably, set to 600 seconds.

When determining that the predetermined time has elapsed (step S206: YES), the controller 50 proceeds to the next step S207.

When determining that the predetermined time has not elapsed yet (step S206:NO), the controller 50 repeats the process until the predetermined time elapses.

Next, the controller 50 stops (turns off) the vacuum pump 4514*e* (step S207).

Next, the controller 50 closes the hollow fiber valves 4513*c* of the colors belonging to the group j (CLOSE) (step S208).

Next, the controller 50 adds "1" to the group number j (j=j+1) (step S209). Thereafter, the process proceeds to step S203.

The process of step S112 to step S117 in FIG. 5 will be described in detail with reference to FIGS. 10 to 12. FIG. 10 shows examples of the calculated upstream pressures, downstream pressures, and pressure differences Δi of the respective colors. FIG. 11 shows the calculated pressure differences Δi of the respective colors rearranged in ascending order. FIG. 12 shows an example of the result of grouping the pressure differences (Δi sort) of the respective colors arranged in ascending order. Herein, n=4 and A=0.4 are applied.

First, in step S113, in the case of i=1, Δ1_sort=10 is added to the group 1. Both the max (group 1) and the min (group 1) are 10. Therefore, in step S114, (10−10)/10=0<0.4 is obtained. In step S115, "i" is set to i=1+1=2, and the process proceeds to step S112.

In step S113, in the case of i=2, Δ2_sort=10 is added to the group 1. Both the max (group 1) and the min (group 1) are 10. Therefore, in step S114, (10−10)/10=0<0.4 is obtained. In step S115, "i" is set to i=2+1=3, and the process proceeds to step S112.

In step S113, in the case of i=3, Δ3_sort=12.5 is added to the group 1. The max (group 1) is 12.5, and the min (group 1) is 10. Therefore, in step S114, (12.5−10)/12.5=0.2<0.4 is obtained. In step S115, "i" is set to i=3+1=4, and the process proceeds to step S112.

In step S113, in the case of i=4, Δ4_sort=20 is added to the group 1. The max (group 1) is 20, and the min (group 1) is 10. Therefore, in step S114, (20−10)/20=0.5 >0.4 is obtained. As a result, in step S116, Δ4_sort=20 is excluded from the group 1; in step S117, "j" is set to j=1+1=2; and the process proceeds to step S112. Thereafter, in step S113, Δ4_sort=20 is added to the group 2. Both the max (group 2) and mm (both of group 2) are 20. Therefore, in step S114, (20−20)/20=0<0.4 is obtained. In step S115, "i" is set to i=4+1=5, and the process proceeds to step S112. In step S112, i=5 >4 is obtained, and the process proceeds to step S118.

As described above, by the process of steps S112 to S117, the controller 50 determines the number of colors for which the discharging control is simultaneously performed, based on the degree of clogging and the predetermined threshold. Thus, the discharging control for colors having similar degrees of clogging can be simultaneously performed.

As described above, the deaeration apparatus 100 of the inkjet recording apparatus 1 in the present embodiment includes the deaeration modules 451 and the controller 50. Each of the deaeration modules 451 is an external reflux type deaeration module that includes a gas permeable membrane (hollow fiber membranes 4512) capable of removing a gas dissolved in ink. The controller 50 performs the discharging control of discharging ink having soaked in the gas permeable membranes for multiple colors simultaneously.

Thus, the deaeration apparatus 100 can shorten the time for performing the discharging control and thereby shorten the printing downtime.

The deaeration apparatus 100 includes the controller 50 configured to detect a degree of clogging in the gas permeable membrane. The controller 50 determines the number of colors for which the discharging control is performed simultaneously, based on the detected degree of clogging.

In simultaneously performing the discharging control for multiple colors, if the degrees of clogging of the hollow fibers in the deaeration modules 451 are different among the colors, the air flows only into the module having less clogging. As a result, the discharging efficiency may decrease. According to the deaeration apparatus 100, the discharging control can be performed simultaneously for the deaeration modules 451 of colors having similar degrees of clogging. Thus, the deaeration apparatus 100 can perform efficient discharging with a balanced flow rate and can improve the discharging efficiency in the discharging control.

Furthermore, according to the deaeration apparatus 100, the controller 50 determines the number of colors for which the discharging control is performed simultaneously, based on the degree of clogging and a predetermined threshold.

Therefore, according to the deaeration apparatus 100, it is possible to easily specify colors having similar degrees of clogging in the deaeration modules 451. Therefore, efficient discharging can be easily achieved, and the discharging efficiency in the discharging control can be easily improved.

Further, according to the deaeration apparatus 100, the controller 50 detects the degree of clogging in the gas permeable membrane, based on a difference between a pressure in an upstream side of the deaeration module 451 and a pressure in a downstream side of the deaeration module 451.

Therefore, according to the deaeration apparatus 100, it is possible to detect the degree of clogging of the deaeration module 451 of each color with a simple configuration. Therefore, efficient discharging can be easily achieved, and the discharging efficiency in the discharging control can be easily improved.

Although the present invention has been described in detail based on the embodiment, the present invention is not limited to the above-described embodiment. The embodiment can be modified without departing from the spirit and scope of the invention.

Modification Example 1

For example, in the above-described embodiment, the degree of clogging is detected by using the difference (pressure difference) between the upstream pressure and the downstream pressure of the deaeration module 451. However, the present invention is not limited thereto. For example, the degree of clogging may be detected by using a time required for the pressure value in the hollow fiber membranes 4512 to reach a predetermined value after the hollow fiber valve 4513*c* is opened and the vacuum pump 4514*e* is driven, instead of using the pressure difference. That is, the controller 50 may detect the degree of clogging by using the time until the air pressure inside the hollow fiber membranes 4512 reaches a predetermined air pressure when the inside of the hollow fiber membranes 4512 opened to the atmosphere is evacuated.

Figure 13:
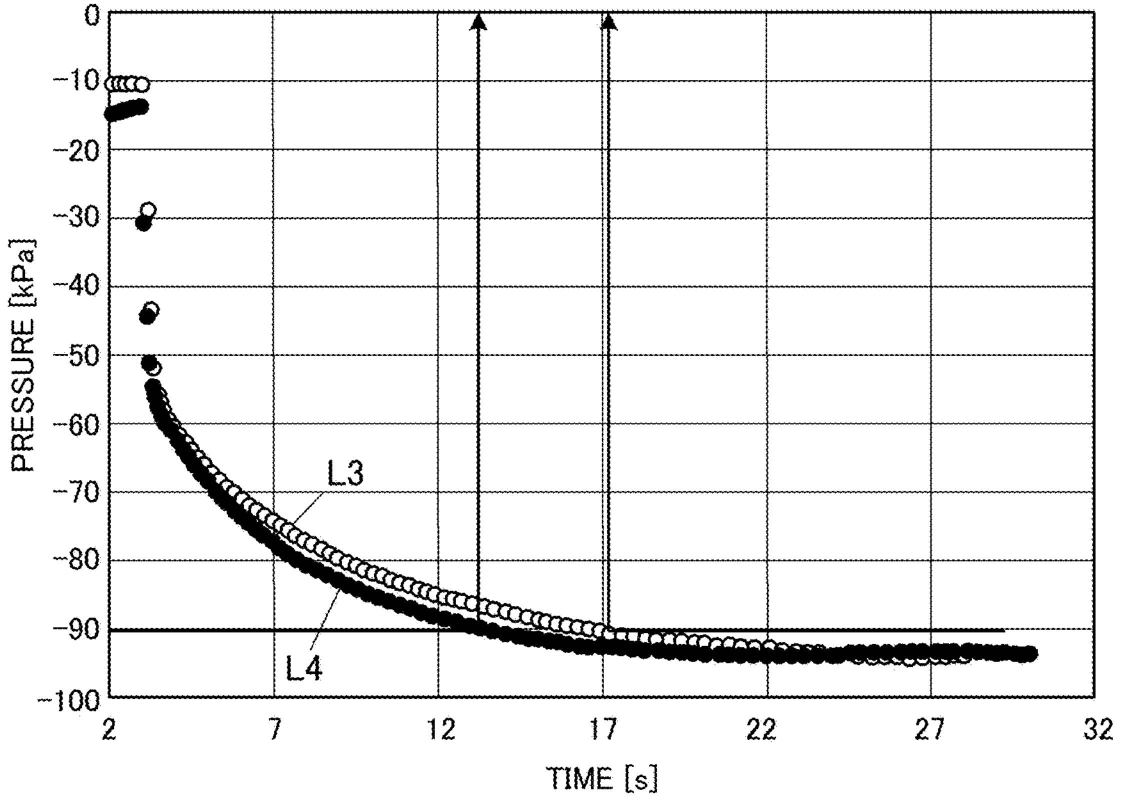
FIG. 13 shows an example of transition of an upstream-side pressure when a vacuum pump is driven.

FIG. 13 shows an example of transition of the upstream pressure when the vacuum pump 4514*e* is driven. In the example shown in FIG. 13, the predetermined air pressure is −90 kPa. In the example shown in FIG. 13, it is found that, when the hollow fiber membranes 4512 is clogged (symbol L3), it takes more time to reach the predetermined air pressure (−90 kPa), as compared with when the hollow fiber membranes 4512 is not clogged (symbol L4).

In the modification example 1, the controller 50 detects the degree of clogging, based on the difference of time until a predetermined atmospheric pressure is reached between the case where clogging occurs and the case where no clogging occurs. Specifically, in the flowchart of FIG. 5, the pressure difference is replaced with the time difference to perform the control.

As described above, the controller 50 detects the degree of clogging in the gas permeable membrane, based on a time required for an atmospheric pressure inside the gas permeable membrane to reach a predetermined atmospheric pressure when the gas permeable membrane opened to the atmosphere is evacuated.

Therefore, according to the deaeration apparatus 100, it is possible to detect the degree of clogging of the deaeration module 451 of each color with a simple configuration. Therefore, efficient discharging can be easily achieved, and the discharging efficiency in the discharging control can be easily improved.

Modification Example 2

The degree of clogging may be detected by using the air flow rate in the hollow fiber membranes 4512 after the pressure in the hollow fiber membranes 4512 is reduced and the hollow fiber valve 4513*c* is opened. That is, the controller 50 may detect the degree of clogging using the flow rate of the air inside the hollow fiber membranes 4512 when the depressurized inside of the hollow fiber membranes 4512 is opened to the atmosphere.

Figure 14:
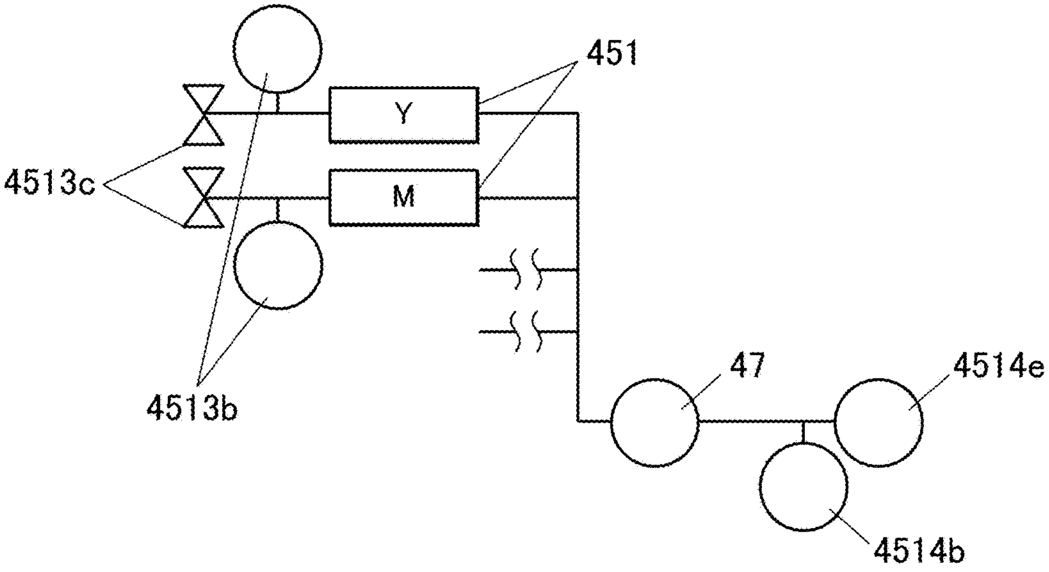
FIG. 14 shows another example of a schematic channel diagram in the vicinity of the deaeration module.

FIG. 14 shows another example of a schematic channel diagram in the vicinity of the deaeration modules 451. In the example shown in FIG. 14, a flow rate sensor 47 is provided in a channel between the deaeration module 451 and the vacuum pump 4514*e*. The flow rate sensor 47 detects the flow rate of air inside the hollow fiber membranes 4512. In general, when clogging occurs in the hollow fiber membranes 4512, the flow rate of air decreases. That is, the smaller the flow rate of air detected by the flow rate sensor 47 is, the greater the clogging is in the hollow fiber membranes 4512. The controller 50 detects the degree of clogging, based on the flow rate of air detected by the flow rate sensor 47. The modification example 2 does not include the step of calculating the difference between the upstream side and the downstream side (see step S108 in FIG. 5). Instead, the degree of clogging is detected by directly using the detected flow rate of each color to perform the discharging control. Specifically, first, the flow rate of each color is detected (acquired). Next, the flow rates of the respective colors are arranged in ascending order (corresponding to step S109 in FIG. 5). Thereafter, grouping is performed, and the discharging control is performed for each group in accordance with step S110 and subsequent steps in FIG. 5.

As described above, the controller 50 detects the degree of clogging in the gas permeable membrane, based on an air flow rate inside the gas permeable membrane when the gas permeable membrane is depressurized and opened to atmosphere.

Therefore, according to the deaeration apparatus 100, it is possible to detect the degree of clogging of the deaeration module 451 of each color with a simple configuration. Therefore, efficient discharging can be easily achieved, and the discharging efficiency in the discharging control can be easily improved.

Other Modification Examples

Although UV ink is used in the embodiment described above as an example, the invention is not limited thereto. The ink is not limited to UV ink. Further, the configuration of the external reflux type deaeration module is not limited to a specific configuration.

However, in the case of using UV ink or a deaeration module having hollow fiber membranes made of silicone, more ink enters the hollow fiber membranes 4512. That is, use of UV ink or a deaeration module having hollow fiber membranes made of silicone is more likely to cause clogging. Therefore, the advantageous effects of the present invention are more easily obtained when the present invention is applied to a configuration using UV ink or a deaeration module having hollow fiber membranes made of silicone.

The detailed configuration and operation of components constituting the inkjet recording apparatus can also be appropriately modified without departing from the spirit and scope of the present invention.

Although embodiments of the present invention have been described and illustrated in detail, the disclosed embodiments are made for purposes of illustration and example only and not limitation. The scope of the present invention should be interpreted by terms of the appended claims.

The invention claimed is:

1. A deaeration apparatus comprising:

an external reflux type deaeration module that includes a gas permeable membrane capable of removing a gas dissolved in ink; and a hardware processor that performs discharging control of discharging ink having soaked in the gas permeable membrane, wherein the hardware processor performs the discharging control for multiple colors simultaneously.

2. The deaeration apparatus according to claim 1, wherein the hardware processor detects a degree of clogging in the gas permeable membrane; and based on the detected degree of clogging, the hardware processor determines the number of colors for which the discharging control is performed simultaneously.

3. The deaeration apparatus according to claim 2, wherein the hardware processor determines the number of colors for which the discharging control is performed simultaneously, based on the degree of clogging and a predetermined threshold.

4. The deaeration apparatus according to claim 2, wherein the hardware processor detects the degree of clogging in the gas permeable membrane, based on a difference between a pressure in an upstream side of the deaeration module and a pressure in a downstream side of the deaeration module.

5. The deaeration apparatus according to claim 2, wherein the hardware processor detects the degree of clogging in the gas permeable membrane, based on a time required for an atmospheric pressure inside the gas permeable membrane to reach a predetermined atmospheric pressure when the gas permeable membrane is opened to atmosphere and is evacuated.

6. The deaeration apparatus according to claim 2, wherein the hardware processor detects the degree of clogging in the gas permeable membrane, based on an air flow rate inside the gas permeable membrane when the gas permeable membrane is depressurized and opened to atmosphere.

7. The deaeration apparatus according to claim 1, wherein the ink is UV ink.

8. An inkjet recording apparatus comprising:

the deaeration apparatus according to claim 1;

an ink storage section that stores ink; and an ink ejection head that ejects ink from nozzles, wherein the deaeration module of the deaeration apparatus is provided between the ink storage section and the ink ejection head.

9. A deaeration method for a deaeration apparatus that includes an external reflux type deaeration module having a gas permeable membrane capable of removing a gas dissolved in ink, the method comprising performing discharging control of discharging ink having soaked in the gas permeable membrane, wherein the discharging control is performed for multiple colors simultaneously.

10. A nontransitory computer-readable storage medium storing a program for a computer of a deaeration apparatus that includes an external reflux type deaeration module having a gas permeable membrane capable of removing a gas dissolved in ink, the program causing the computer to perform discharging control of discharging ink having soaked in the gas permeable membrane, wherein the program causes the computer to perform the discharging control for multiple colors simultaneously.

* * * * *